United States Patent [19]
Reid et al.

[11] Patent Number: 4,691,532
[45] Date of Patent: Sep. 8, 1987

[54] DUAL COOLING/HEATING SYSTEM ENERGY RECOVERY

[75] Inventors: Edward A. Reid, Westerville; F. Bert Cook, Columbus; Edgar M. Purvis, Troy, all of Ohio

[73] Assignee: Columbia Gas System Service Corp, Wilmington, Del.

[21] Appl. No.: 945,091

[22] Filed: Dec. 22, 1986

Related U.S. Application Data

[62] Division of Ser. No. 683,187, Nov. 13, 1984, Pat. No. 4,646,541.

[51] Int. Cl.[4] ............................................. F25B 15/00
[52] U.S. Cl. ........................................ 62/476; 62/483
[58] Field of Search ....................... 62/238.3, 112, 476, 62/107, 141, 483, 487, 236, 324.2, 489, 81

[56] References Cited

U.S. PATENT DOCUMENTS 3,132,493  5/1964  Peckham et al. ..................... 62/483
3,296,823  1/1967  Novak et al. ........................ 62/476

Primary Examiner—Lloyd L. King
Attorney, Agent, or Firm—Robert B. Watkins

[57] ABSTRACT

This invention relates to a cooling and heating system which operates on the absorption and phase change heat exchange principle. More particularly it relates to a continuous heat actuated, air cooled, double effect generator cycle, absorption system. In further aspects, this invention relates to a system constructed for use with an absorption refrigeration solution pair consisting of a nonvolatile absorbent and a highly volatile refrigerant which is highly soluble in the absorbent. A disclosed refrigerant pair are ammonia as the refrigerant and sodium thiocyanate as the absorbent. An absorption cycle is disclosed using the thermo physical properties of sodium thiocyanate/ammonia, absorption/refrigerant pair. Also disclosed is the construction and configuration of a reverse cycle air cooled double effect generator absorption refrigeration system for use with the sodium thiocyanate/ammonia refrigeration pair, as well as subcompositions, subsystems and components that improve the system efficiency and reduce cost.

11 Claims, 8 Drawing Figures

DUAL COOLING/HEATING SYSTEM ENERGY RECOVERY

CROSS-REFERENCE

This application is a division of co-pending application Ser. No. 683,187 filed Nov. 13, 1984, now U.S. Pat. No. 4,646,541.

FIELD OF THE INVENTION

This invention relates to a cooling and heating system which operates on the absorption and phase change heat exchange principle. More particularly it relates to a continuous heat actuated, air cooled, multiple effect generator cycle, absorption system.

In further aspects, this invention relates to a system constructed for use with an absorption refrigeration solution pair comprising a nonvolatile absorbent and a highly volatile refrigerant which is highly soluble in the absorbent. A disclosed refrigerant pair are ammonia as the refrigerant and sodium thiocyanate as the absorbent.

BACKGROUND OF THE INVENTION

There are two major types of absorption refrigeration equipment in commercial use: (1) air cooled systems using ammonia as the refrigerant and water as the absorbent, and (2) water cooled systems using water as the refrigerant and lithium bromide as the absorbent.

Although these are the major types in commercial use, and there are many patents relating to these and other types, variations have been patented from these general principles and the following are typical examples of such patents: U.S. Pat. No. 4,055,964—Swenson et al. and U.S. Pat. No. 2,350,115—Katzow.

Others have demonstrated air cooled absorption refrigeration systems using other absorbent, refrigerant pairs. The following patents relate to these systems: U.S. Pat. No. 4,433,544—Rojay et al. and U.S. Pat. No. 3,483,710—Bearint.

Still others have patented water cooled refrigeration systems using other salts or other salts in combination with lithium bromide as the absorbents. The following are examples of these: U.S. Pat. No. 3,609,086—Modahl et al. and U.S. Pat. No. 3,541,013—Macriss et al.

Water cooled refrigeration circuits using the double effect generator are also in commercial use and have been patented as seen in the following patents: U.S. Pat. No. 3,495,420—Loweth et al., U.S. Pat. No. 3,389,573—Papapanu et al., U.S. Pat. No. 4,183,228—Saito et al., and U.S. Pat. No. 2,182,453—Sellew.

In absorption refrigeration and/or heating systems, the generator, sometimes called desorber, is a very important part of the system and contributes significantly to the overall efficiency. Much attention has been given to the construction of these devices, and various arrangements are shown in the following patents: U.S. Pat. No. 3,323,323—Phillips, U.S. Pat. No. 3,608,331—Leonard, and U.S. Pat. No. 4,127,993—Phillips, and U.S. Pat. No. 4,424,688—Wilkinson.

These existing air cooled absorption refrigeration circuits have demonstrated cooling coefficients of performance as high as 0.50 using various absorbent/refrigerant pairs. These systems have also been demonstrated as heating only heat pumps with a coefficient of performance of up to 1.3.

As used herein, coefficient of performance; i.e. COP, is defined as the energy transferred at the load in BTU/unit of time over the energy provided to the system in BTU/unit of time which is well understood by those skilled in the art.

Air cooled refrigeration circuits have also been demonstrated which can be reversed to provide either heating or cooling to an air conditioned space (a load) by switching the flow of an intermediate heat transfer solution typically consisting of water and antifreeze solutions such as ethylene glycol, etc.

Liquid cooled absorption refrigeration circuits using the double effect generator cycle to achieve high efficiency are commercially available. However, these systems are not suitable for use in heating a conditioned space (the heating load) since the refrigerant freezes at 32° F. and therefore cannot be used in a space heating system at ambient temperatures below approximately 40° F.

Absorption refrigeration and heat pump systems are well known in their basic operating characteristics and need little further description except to establish the definitions and context in which this invention will be later described.

In a typical system a refrigerant, water or other phase change material is dissolved in a absorbent (typically lithium bromide or other salts) and these are often called the "solution pair". The refrigerant is absorbed or desorbed (expelled) in or out of solution with the absorbent to varying degrees throughout the system and the heat of absorption is added or extracted to produce heating and cooling effects.

The solution pair enters a generator where it is subjected to heat and the applied heat desorbs (expells) the refrigerant water in the form of a vapor which is conveyed to the condenser. There, external ambient cooling condenses the refrigerant vapor to liquid, which is conveyed through an expansion valve, into an evaporator where heat is gained. In the refrigeration system operation the heat gained in the evaporator is from the cooling load.

The low pressure vapor then passes to an absorber where ambient cooling allows the absorbent solution to absorb the refrigerant vapor. The solution is then conveyed to a recuperator by a pump. The recuperator is a counterflow heat exchanger where heat from the absorbent/refrigerant solution, flowing from the generator to the absorber, heats the returning solution pair flowing from the absorber to the generator. In the heating cycle, the cooling applied at the absorber and/or the condenser is the heat delivery to the heating load.

As a matter of convenience and terminology herein, each part of the absorption system which operates at the same pressure is termed a chamber.

Conventional absorption refrigeration/heating systems are two chamber systems although three chamber systems appear in the prior art and have seen limited use. When operated as a heat pump two chamber systems give respectable heating performance but give poor cooling performance.

Using ammonia ($NH_3$) as the refrigerant and water ($H_2O$) as the sorbent, heat pumping can occur from an ambient air source which is at temperatures below freezing. In a theoretical assessment where the air is treated as if it were dry so that no defrosting is necessary, the typical two chamber $NH_3/H_2O$ heat pump would represent a significant improvement over what would be expected of a simple furnace. However, since heat pumps are more expensive than furnaces, cooling season performance benefits are needed to justify the added expense. In other words, the heat pump must act as an air conditioner also to offset the cost of a separate installation of an air conditioner with the furnace.

For cooling, an $NH_3/H_2O$ system is predicted to have a COP equal to about 0.5. This low performance index causes unreasonable fuel (or energy) costs from excessive fuel (or energy) use. This low performance of the ammonia/water system results from the poor performance characteristics of the ammonia/water solution at the higher temperature ranges, if the heat is supplied to the absorption system at higher temperatures.

Three-chamber systems of various types have been suggested which would improve the performance by staging the desorption process into effects. This would allow for increasing the actual temperature at which the driving heat is added to the system (cycle). The reference Carnot cycle efficiency would be increased and the real cycle would follow suit. Until the present invention it was thought that this increase in temperature would represent an unreasonably high pressure, especially for ammonia/water systems, and would force the system to operate in regions for which data is not readily available.

In addition the pressure has tended to rule out ammonia/water in a three-chamber system. The search for organic material such as halogenated hydrocarbons and other refrigerants as a replacement for the ammonia has been limited by fluid stability at these higher temperatures. Normal organic refrigerant stability tests have indicated that it is necessary for oil to be present for operation in vapor compression refrigeration systems. These high operating temperatures rule out most of the common refrigerants, particularly being heated directly by combustion products which often cause local hot spots, which result in working fluid degradation and/or corrosion of components.

U.S. Pat. No. 4,441,332—Wilkinson is an example of a four-chamber absorption refrigeration system to provide refrigeration and/or heat pump total capability. This prior art patents employs two chemically separated two-chamber systems which are mechanically integrated into a total system to take advantage of the high performance of one solution pair in a low temperature range for cooling and the advantages of the other solution pair in a high temperature range when the total system is heat pumping in the heating mode.

The invention described herein is an integrated three-chamber system having one solution pair using an organic material of unusual fluid stability at higher temperatures when manipulated in an apparatus and system to take advantage of its properties. The typical preferred solution pair for operation as part of the system and components of this invention is ammonia as the refrigerant and sodium thiocyanate as the absorbent.

Others have given consideration to this solution pair as examplified by the ASME publication "Performance of A Solar Refrigeration System Using Ammonia—Sodium Thiocyanate", by Swartmen et al., in November 1972 and the publication entitled "A Combined Solar Heating/Cooling System", by Swartmenn and presented July 28–Aug. 1 1975 at the 1975 International Solar Energy Congress and Exposition and U.S. Pat. No. 3,458,445—Macriss et al.

The heat actuated, air cooled, double effect generator cycle absorption refrigeration system of this invention overcomes limitation of the existing prior art technology. The air cooled system of this invention eliminates the need for cooling water and the use of ammonia as the refrigerant avoids refrigerant freezing during heating operation. The double effect generator cycle permits efficiency through internal heat recovery in the absorption refrigeration circuit. The use of sodium thiocyanate as the absorbent eliminates the need for analyzers and rectifiers to purify the refrigerant stream. Internal refrigerant flow reversal, to achieve heat/cool switching and defrosting, eliminates the need for intermediate water/antifreeze heat transfer loops to switch from heating to cooling operation.

SUMMARY OF THE INVENTION

A combination of a double effect generator absorption cycle, the thermo/physical properties of which are enhanced by the application of the sodium thiocyanate/ammonia absorbent/refrigeration pair, with the arrangement of a reverse cycle air cooled double effect refrigeration circuit with generator and heat exchanger in a stacked coil configuration including tube in tube concepts, together with the combination of energy recovery motors to contribute to the power requirement of the solution pump and means for positioning the refrigerant reversing valve(s) to provide warm refrigerant vapor through the refrigerant to air heat exchanger while still producing heat from the system as a way of defrosting the refrigerant to air heat exchanger when outside air temperatures are low.

The invention includes an absorption refrigeration and/or heating process wherein a highly volatile chemically and thermally stable refrigerant (ammonia) is alternately absorbed in and expelled from an absorbent (sodium thiocyanate) with the process conducted as a double effect system in the generator section.

In further summary, the invention includes an absorption refrigeration and/or heating system in connection with a cooling or heating load, and a heat sink or source, preferably ambient air, to selectively provide heat to or remove heat from the load, comprising:

(a) a multiple effect generator means to heat an absorbent solution pair comprising a nonvolatile absorbent and highly volatile refrigerant which is soluble in the absorbent and to desorb a portion of the refrigerant from the pair, the generator means comprising a first vessel constructed to receive sufficient heat of combustion to desorb refrigerant from the pair, and at least one additional vessel connected to the first vessel to receive the refrigerant and exchange heat from the refrigerant with the solution pair to further desorb refrigerant from the solution pair;

(b) a first heat exchanger means connected between the first and second effect generators and a second heat exchanger means, the first heat exchanger means being constructed to exchange heat between the ambient air in proximity thereto and a fluid therein, and the second heat exchanger means being constructed to exchange heat between the load and a fluid therein, each heat exchanger means selectively connectable to the first and second generator means;

(c) valve means in the connections between the first and second effect generator means, the first heat exchanger means and the second heat exchanger means, selectively:

(i) to cool the load by directing the refrigerant from the first and second effect generator means through the first heat exchanger means to cool the refrigerant by heat exchange with the ambient air, and to direct the refrigerant from the first heat exchanger means to the second heat exchanger means to cool the load by heat exchange between the refrigerant and the load upon expansion of the refrigerant in the second heat exchanger means, or (ii) to heat the load by directing the refrigerant from the first and second effect generator means through the second heat exchanger means to heat the load by exchange of heat from the refrigerant to the load, and to direct the refrigerant from the second heat exchanger means to the first heat exchanger means to heat the refrigerant by exchange of heat with the ambient air;

(d) an absorption means selectively connectable by the valve means to the second heat exchanger means when the second heat exchanger means is cooling the load according to (c) (i) or to the first heat exchanger means when the second heat exchanger means is heating the load according to (c) (ii); and (e) a pump means connected between an absorber means and the first generator means to transfer the solution to the first generator means at higher pressure.

It is an object of this invention to provide in combination an absorption refrigeration and/or heating system which may be operated either in a heating mode or a cooling mode by interchanging the use of various of components by means of valves and/or controls. Another object of the invention is to operate such a system using a specific solution pair, ammonia as the refrigerant and sodium thiocyanate as the absorbent in a double effect system.

A further object of the invention is to increase the efficiency of an absorption refrigeration and/or heating system by passing the operating solutions through motive units to augment the solution pump and reduce the external power requirements of the system. Still a further object of the invention is to operate an absorption refrigeration and/or heating system. A further object of this invention is to maintain a major portion of the space heating capacity of the system during the defrost cycle. Still a further object is to use the hot working fluid from the absorber in the heating and cooling modes, and the hot working fluid from the second heat exchanger in the heating mode, to preheat domestic hot water. Still a further object is to use the heat pump to preheat domestic water when there is no space heating or space cooling demand. A further object of this invention is to provide an air cooled absorption heat pump with a cooling COP greater than 0.8 and a heating COP greater than 1.5.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention which is delineated in the included Claims.

DETAILED DESCRIPTION OF THE INVENTION

In the description of this invention, it is important that there is a clear understanding of the meanings of the terms used herein. Otherwise, because of the complexity of the entire system and the use of components from various fields of mechanical, chemical, and electrical arts, the terminology could be confusing in some cases.

Therefore, as used herein the term "strong solution", when speaking of the solution pair refers to that solution that has picked up refrigerant in the absorber and is in progress toward the generator and carries a higher ratio of refrigerant to absorbent than solution which has been desorbed and partially expelled of refrigerant in the generator(s) of the system. Solution from which refrigerant has been expelled is, by contrast, a "weak" or weaker solution holding a lesser ratio of refrigerant to absorbent in solution.

In the three chamber system of this invention, a solution of "intermediate" strength is employed between the generator means. This solution is by definition, weaker than strong solution and stronger than weak solution.

The terms "generator" and "desorber" are synonymous. The term "heat exchanger" defines an apparatus where fluids are passed in close proximity to each other separated only by a usually impervious wall through which the heat from the warmer is conducted to the cooler. Conventionally, it is understood that heat passes from the hot fluid to the cold fluid.

As used herein, the term "heat exchanger" defines apparatus which exchanges heat into or out of the system; i.e., with an external fluid such as ambient outdoor air, or ground water, or air conditioned indoor living space environmental air. Those apparatus which exchange heat within the system are termed "recuperators".

Figure 1:
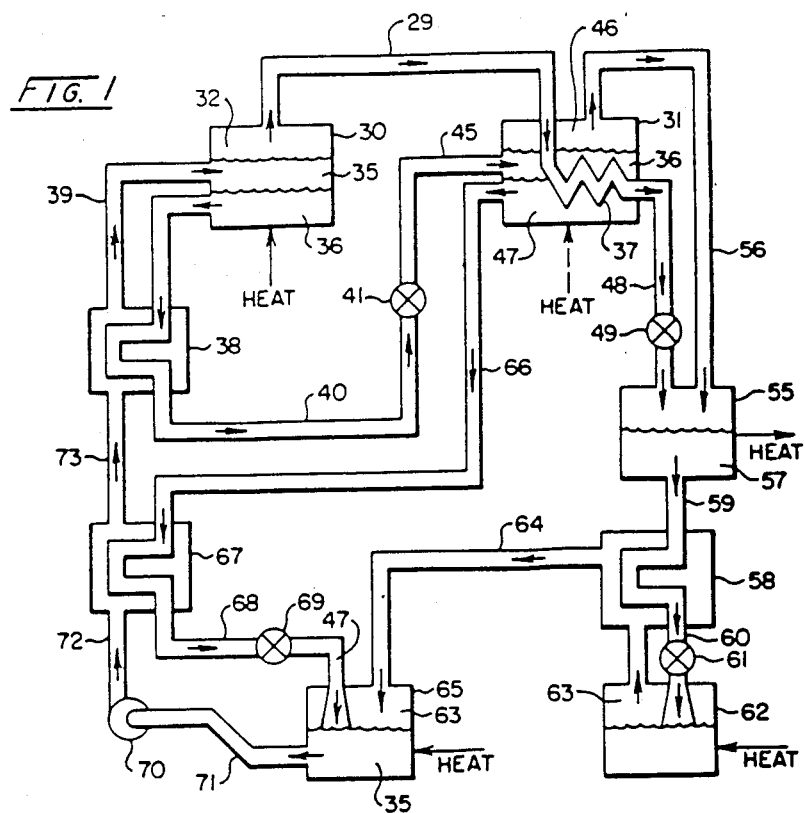
FIG. 1 is a diagram of typical double effect absorption refrigeration cycle system.

Referring to FIG. 1, and as a point of reference, a double effect absorption refrigeration system, is provided with a first effect generator means 30 and a second effect generator means 31, depicted schematically as vessels. The generator means 30 contains a vapor phase of a refrigerant 32 in the system, and a strong liquid phase solution 35 or intermediate solution 36 of the refrigerant with an absorbent. Heat is applied from an external source, such as a gas flame, to the vessel 30 which raises the temperature of the strong solution 35 above the vaporization point at the first pressure in the vessel 30 and provides latent heat of vaporization. Refrigerant vapor 32 is desorbed from the solution 35 and expelled through a connecting conduit 29 to a heat transfer means 37 in the second effect generator means 31.

A weaker, intermediate solution 36 remains in the generator means 30, from which it is conveyed in heat exchange relationship, through a recuperator 38, where heat is transferred to the strong solution 35 that is being conveyed through a connection 39 to the generator means 30. From the recuperator 38, the intermediate solution 36 is conveyed by means of a connection 40 through a throttling valve 41 where the pressure is reduced to a second intermediate pressure and is introduced into the vessel of the second generator means 31 by means of a connection 45.

In the vessel 31 additional heat is transferred to the liquid intermediate solution 36 by means of the heat transfer unit 37. This further raises the temperature of the intermediate solution 36 and adds heat sufficient to expell further vaporous refrigerant 46, leaving a weak solution 47 of the refrigerant and absorbent in the second effect generator means 31.

Although double effect generator systems are the most usually disclosed in the prior art, successive additional generators are also shown, and thus a "multiple" effect system may be considered as an extension of the concepts involved.

In a typical multiple effect absorption refrigeration system, further external heat need not be supplied to the second or successive generators. Beneficial effects can be obtained by further heating of the intermediate solution through heat exchange with the refrigerant vapor 32 from the first effect generator 30. However, external heat depicted in phantom in FIG. 1 may be applied to the vessel 31. Also external heat can be applied to recuperators 38 and 67.

Partially condensed, refrigerant 32, at the pressure of the first (high pressure) chamber is conveyed from the heat transfer unit 37 through a connection 48 and expansion valve 49 into a condenser 55, depicted schematically as a closed pressure vessel in FIG. 1, where heat is transferred to a cooler surrounding medium, which may be the surrounding outside air or water from a cooling tower. Refrigerant vapor 46 which is expelled in generator means 31 is conveyed to the condenser 55 through a connection 56. Condensed liquid 57 is conveyed to a recuperator 58 by means of connection 59 and then by connector 60 to an expansion valve 61. From the expansion valve 61 the refrigerant sprays into a third, low pressure environment of an evaporator 62 where the refrigerant returns to the vapor state by extracting heat from an external fluid medium which is in contact with the evaporator 62. Low pressure refrigerant vapor 63 is conveyed through recuperator 58 where heat is recouped from the liquid 57 passing to the evaporator 62. From the recuperator 58 the low pressure vaporous refrigerant 63 is conveyed through a connection 64 to an absorber 65 where the weak solution 47 has been collected.

After expelling further refrigerant vapor in the second effect generator means 31, the weak solution 47 is conveyed by a connection 66 through a recuperator 67 and a connection 68 to a throttling valve 69. In the recuperator 67 heat is transferred to strong solution 35 as it is conveyed to the first effect generator 30.

In the absorber 65 the refrigerant vapor 63 is absorbed in the weak solution 47 to produce the strong solution 35. In the process, heat is rejected to a surrounding medium, or a working fluid in contact with the absorber.

A solution pump 70 conveys the strong solution through a connection 71, and connections 72, 73, and 39, and through recuperators 67 and 38 to the first effect generator 30.

A double effect absorption system, as shown in FIG. 1, is a three-chamber system, since the second effect generator 31 operates at a pressure intermediate between the higher pressure of the first generator means 30 and the lower pressure of the evaporator 62 and absorber 65.

As described in the Background of the Invention portion of this disclosure, for many years a large variety of proposals have been made for employing a three-chamber system using a single refrigerant pair. Numerous problems exist which have defied satisfactory solution prior to the present invention. One problem not heretofor satisfactorily solved was the identification of an appropriate solution pair in which the pair could operate at the higher temperatures to which the refrigerant could be driven at reasonable pressures in a double effect system. Although ammonia has remained the best prospect for the refrigerant, its absorption in water has proven unattractive because it is difficult to adequately separate the refrigerant and absorbent vapors from the generators of the double effect system without unreasonably complicated equipment.

In this invention ammonia as a refrigerant and sodium thiocyanate as the sorbent are conceived to be an appropriate solution pair in the double effect system. This is especially true in combinaton with the other features of the applicants' invention to be later described. For instance, the combination refrigeration and/or heating system can be located externally of a living enclosure in an air conditioning/space conditioning useage.

DOUBLE EFFECT GENERATOR ABSORPTION CYCLE WITH SWITCHING BETWEEN COOLING, HEATING AND DEFROSTING

Figure 2:
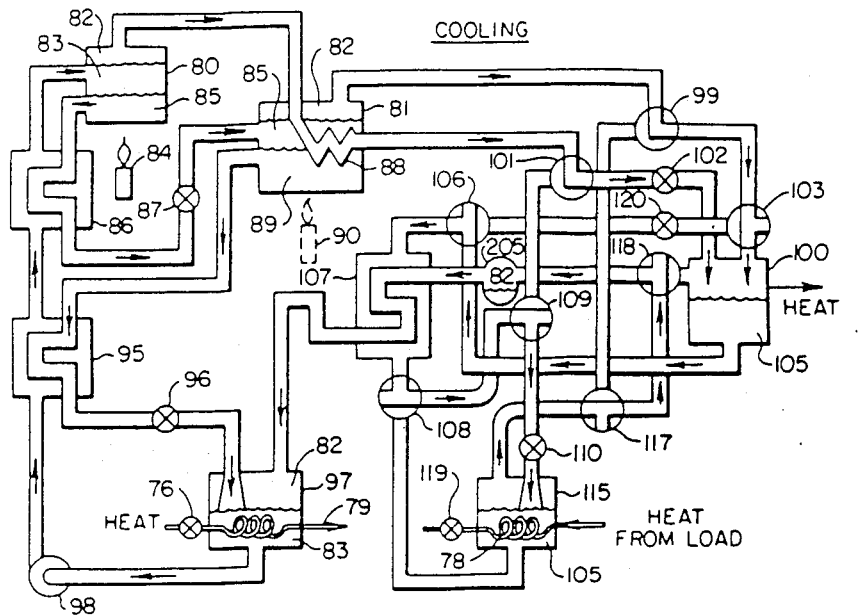
FIG. 2 is a diagram of the double effect absorption system of this invention in the cooling mode.
Figure 3:
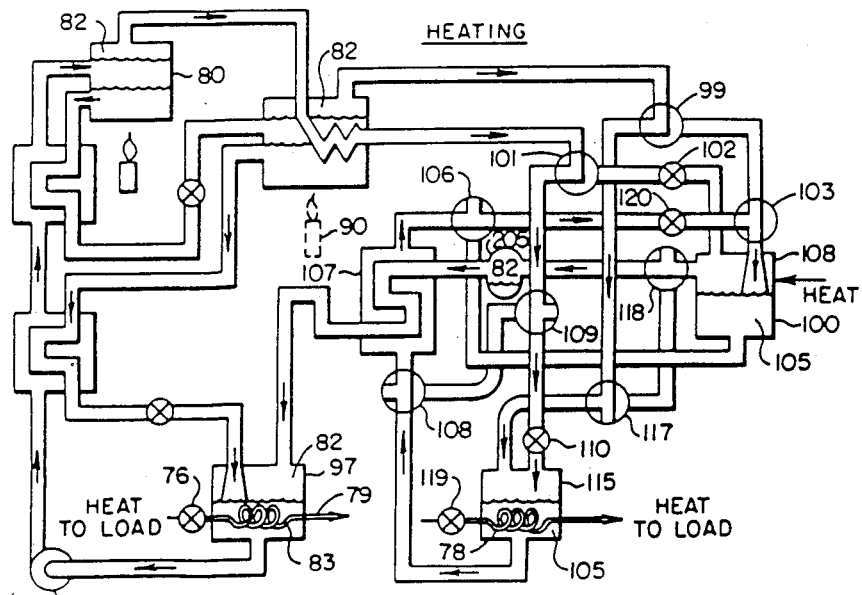
FIG. 3 is a diagram of the double effect absorption system of this invention in the heating mode.

An absorption heat pump designed to provide both space heating and space cooling must be able to be reversed between the heating and the cooling modes without adversely effecting the operation of the absorption refrigeration cycle. In this invention this reversal may be accomplished by using switching valves in the refrigerant lines in the heat pump. The location and operation of the switching valves is shown in FIGS. 2 and 3, which illustrate the cooling and heating mode valve functions, respectively. Switching may be accomplished by one six-way valve.

Refrigerant switching permits direct refrigerant heat transfer to the ambient conditions. This approach results in higher heat transfer efficiency because of the higher temperature difference between the refrigerant and the heat source or heat sink and reduces the weight and cost of the heat pump by eliminating the intermediate heat transfer loop. This concept of refrigerant switching avoids any change in the effective working volume of the heat pump when switching from one mode to the other.

Referring to FIG. 2, in a manner similar to the system described in FIG. 1, a first generator means 80 desorbs a vapor refrigerant 82 from a strong solution 83 by the application of heat from a source 84, such as a gas flame. A solution of intermediate strength 85 remains in the vessel and is conveyed to a first recuperator means 86 and through a throttling valve 87 to a second generator means 81. Heat from the refrigerant vapor 82 is exchanged with the intermediate solution 85 in the vessel 81 through a heat conduction means 88, and additional vapor 82 is desorbed from the intermediate solution 85 leaving a weak solution 89 in the vessel 81.

Additional heat may be supplied from the same source 84 or a second source 90, to further enhance the desorption process.

In the manner described for the system of FIG. 1, the weak solution 89 passes through a second recuperator means 95, and a throttling valve 96 into an absorber means 97. Weak solution 89 absorbs vaporous refrigerant 82 becoming a strong solution 83 which is pumped by a solution pump 98 successively through recuperator 95 and 86 back to the first generator means 80.

Operating in the cooling mode, refrigerant vapor 82 is conveyed to a first heat exchanger means 100 through a first two-way valve means 101 and an isenthalpic expansion valve 102, from the first effect generator means 80 after passing through the second effect generator means 81. Refrigerant vapor 82 is also conveyed from the second effect generator 81 to the first heat exchanger means 100 through a second two-way valve means 99 and a third two-way valve means 103. Operating as a condenser the first heat exchanger 100 is cooled by surrounding ambient conditions, such as outside air, at a lower temperature. Cooling may also be provided by ground water, earth or a cooling tower. Condensed liquid refrigerant 105 is conveyed from the first heat exchanger 100 through a fourth two-way valve 106, a third recuperator 107, fifth and sixth two-way valves 108 and 109 and an isenthalpic expansion valve means 110 to a second heat exchanger means 115. Through the expansion valve 110, the pressure is reduced and refrigerant 116 is evaporated in the second heat exchanger 115 by gaining heat from a cooling load. Refrigerant vapor at low pressure is conveyed from the heat exchanger 115 through seventh and eighth two-way valves 117 and 118 to the absorber 97 passing through the recuperator 107.

An accumulator 205 is provided between valve 118 and recuperator 107 for the collection of excess refrigerant 82. Excess refrigerant may occur as a result of changes in the amount of refrigerant contained in the first and second heat exchangers at different operating conditions, especially differences between cooling, heating and defrost modes of operation.

This permits the system to operate at the optimum solution concentration in whichever mode the system is operating by storing a small mass of refrigerant as vapor or a greater mass of refrigerant as liquid. This prevents a loss of efficiency due to the inability of the system to effectively absorb and desorb under various operating temperatures and pressures.

It is an important feature of this invention that an accumulator is provided in combination with the refrigerant switching concept that allows for changing from the cooling to the heating mode and vice versa. Conventionally, accumulators are not provided in an absorption refrigeration system because the operating system conditions remain unchanged and sufficiently within the designed or controlled parameters.

Referring to FIG. 3, in the heating mode the apparatus remains substantially the same, except that the two-way valves 99, 101, 103, 106, 108, 109, 117, and 118 are reversed. Since the apparatus does not change, the numerals designating the various components are the same.

Liquid refrigerant 82 under high pressure is reversed in the valve 101 and is connected through the valve 109 and the expansion valve 110 to the second heat exchanger 115 (which is operating as the condenser in the system). Additional vaporous refrigerant 82 from the second generator 81 at lower pressure is reversed through the valves 99 and 117 and conveyed to the second heat exchanger 115 where it is condensed to liquid refrigerant 105, joining the refrigerant from the first generator 80. The liquid refrigerant 105 is conveyed through the valve 108, which has been reversed, and through the recuperator 107 and valve 106 to an isenthalpic expansion valve 120 and valve 103. Leaving the expansion valve 120, refrigerant 105 enters the first heat exchanger 100 (which is operating as the evaporator in the system). Upon pressure reduction the liquid evaporates by absorbing heat from the outside air and is conveyed as a vapor through valve 118, and recuperator 107 into the absorber 97 where it is absorbed in the weak solution 89 and is pumped back to the first generator means by the pump 98.

In the heating mode shown in FIG. 3, heat is transferred to the load in the second heat exchanger 115 by condensing refrigerant directly in the condensing process. In addition, the absorption of the vapor refrigerant in the absorber 97 is a subprocess generating heat, and in the process of this invention a substantial portion of the transfer to the load is carried out from the absorber.

In the residential air conditioning embodiment of this invention, the space conditioning load is transferred to and from heat exchanger 115 by means of an antifreeze working solution flowing in a conduit 78, which is conveyed from a conventional heat exchanger in the air transfer ducts of the residence (not shown) to the second heat exchanger 115 in both the heating and the cooling mode and to the absorber in the heating mode. Any problems associated with the toxicity of either the refrigerant or the absorbent are avoided within the conditioned space and/or the residence structure.

The composition of the working solution may be alcohol and water, or glycol and water or other antifreeze fluid.

As shown in FIG. 3, an additional conduit 79 provides another connection for conveyance of working fluid in heat transfer relationship through the absorber 97. The conduit 79 is connected for use in heat transfer with the load, and may be combined with the flow of working fluid from the conduit 78 conveying working fluid from the heat exchanger 115. Typically, a valve 76 may modulate the flow of working fluid in the conduit 79 and by this means heat transfer from the absorber 97 may be controlled.

In the heating mode, because the first heat exchanger 100 has been reversed to act as the evaporator in the system, heat is added to the absorber by heat pumping from the ambient surrounding source. The use of this heat by heat transfer in the absorber 97, through the conduit 79, is an important addition to the efficiency of the unit as well as providing an important source of recovered heat for other domestic uses in the living space. For instance, the working fluid conveyed in the conduits 78 and 79 may be combined and transferred to the air conditioning heating load during the wintertime. During the summertime, the warm working fluid from the absorber 97 may be conveyed through a domestic hot water preheater providing savings in that part of the operation of living space. Because of the switching arrangement, with appropriate valves, various combinations of uses of the heat energy from the absorber 97 and the second heat exchanger 115 may be employed.

The following Table A shows the source of working fluid that may be directed to the various uses in the living space. It is especially significant to note the large number of circumstances, under which water heating capability is provided while the space cooling and space heating loads are being simultaneously satisfied. There is additional flexibility, in that flow through the conduit 79 may be arranged to add the heat to the flow through conduit 78 with no flow to the water heating use.

TABLE A

| SYSTEM MODE | WATER HEATING | SPACE COOLING | SPACE HEATING |
|---|---|---|---|
| Cooling | 97 | 115 | — |
| Cooling | — | 115 | — |
| Heating | 97 + 115 | — | — |
| Heating | 97 | — | 115 |
| Heating | 115 | — | 97 |
| Heating | 97 + 15 | — | 97 + 115 |
| Heating | — | — | 97 + 115 |

ABSORPTION REFRIGERATION AND HEAT PUMPING SYSTEM CONTAINING AMMONIA AND SODIUM THIOCYANATE

While others have worked with the solution pair ammonia ($NH_3$) as refrigerant and sodium thiocyanate (NaSCN) as absorbent in single effect absorption systems, as previously stated in the Background of the Invention portion of this disclosure, the applicants have conceived the double effect and reversible heating and cooling system using this solution pair. The advantages of this system permit high efficiency through internal heat recovery and mechanical energy recovery in the absorption refrigeration circuit; and the use of sodium thiocyanate as the absorbent eliminates the need for analyzers and rectifiers to purify the refrigerant stream. The refrigerant pair ammonia/sodium thiocyanate is uniquely suited to the system of this invention.

Figure 6:
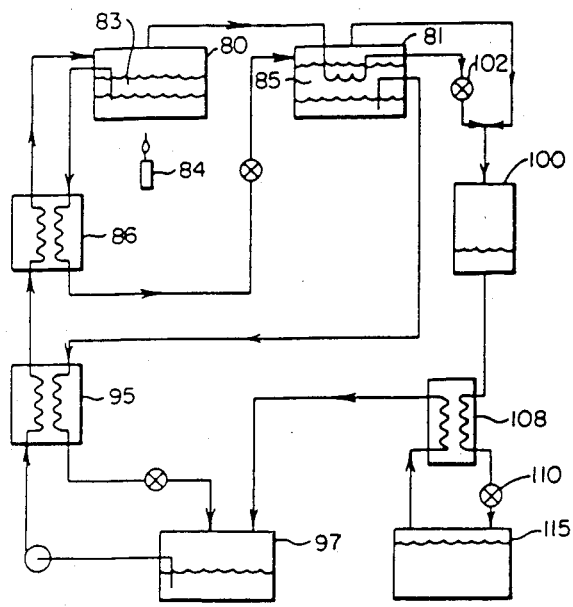
FIG. 6 is a schematic diagram for the absorption cycle of this invention.

Referring to FIG. 6, an operational diagram is shown for the refrigerant and solution for operation in the refrigeration cycle (values are approximately stated). This set of operating conditions would be expected to result in a refrigeration circuit coefficient of performance of approximately 1.0.

At a temperature of about 350° F., strong solution 83 enters the first generator 80 at a pressure of about 1200 psia where it is heated to a temperature of about 370° F. by the external source of heat 84 and refrigerant is desorbed and conveyed into heat exchange relationship with intermediate stength solution 85 in the second generator 81 which is at a pressure of about 270 psia.

The intermediate solution 85 leaves the first generator at a temperature of about 370° F. having been the recipient of direct heat from the source at a rate of about 33,000 btu/hr. and passes through the recuperator 86 where it exchanges heat to the strong solution at a rate of about 56,000 btu/hr. and leaves at a temperature of 220° F. a pressure of 1200 psi. Leaving the recuperator 86 the temperature of the intermediate solution is 220° F. where it is throttled substantially isenthalpically through valve 87 and arrives in the secondary generator 81 at a temperature of 220° F. and a pressure of 270 psia.

In the second generator high pressure vapor is condensed and cooled to 240° F. before entering valve 102 where it is expanded to a saturated vapor and liquid mixture. Approximately 17,000 btu/hr. liberated in this condensation, along with an additional about 6,000 btu/hr. from the flue gases external to the second generator cause additional refrigerant to be desorbed in the second generator, which when mixed with refrigerant from valve 102 go to the condenser at 150° F. and 265 psia.

The condenser expells about 24,000 btu/hr., and the refrigerant temperature is reduced to about 85° F. after leaving the recuperator and before entering the expansion valve 110 where its temperature is further reduced to about 42° F. while its pressure is reduced to about 76 psia in the evaporator. The evaporator 115 absorbs 36,000 btu/hr., evaporating the refrigerant which enters the recuperator 107 at a temperature of about 50° F. and leaves at a temperature of 110° F. on the way to the absorber 97 which is operating at the lower system pressure of about 70 psia.

Weak solution leaves the second generator 81 at a pressure of 270 psia and a temperature of 240° F. passing through the recuperator 95, and transmitting 39,000 btu/hr. to the strong solution 82, which is on the way to the recuperator 86.

Figure 7:
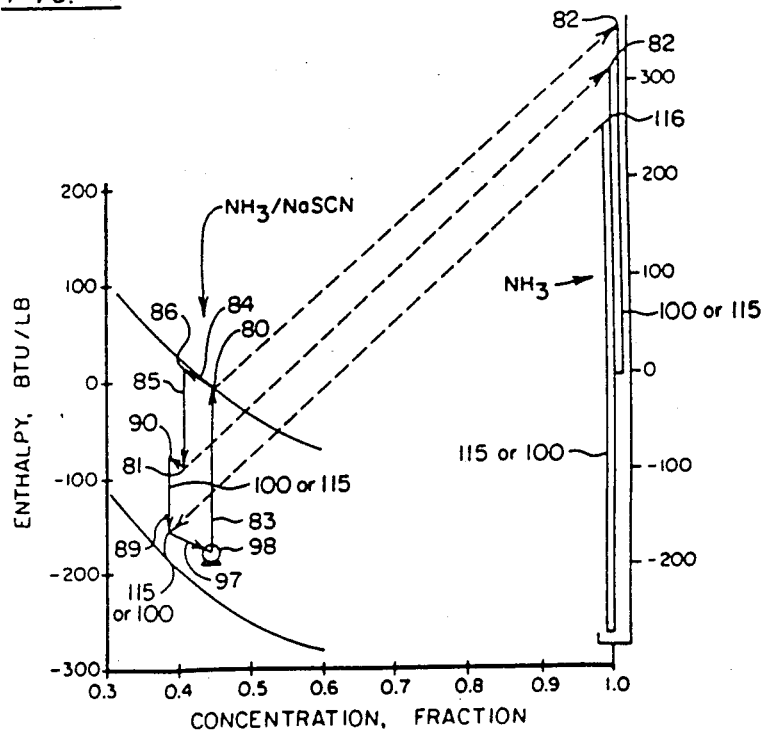
FIG. 7 is a heat versus solution concentration diagram for the double effect absorption cycle of this invention using ammonia as the refrigerant and sodium thiocyanate as the absorbent.

Referring to FIG. 7, an enthalpy diagram for the ammonia/sodium thiocyanate solution is provided showing the component by component changes in solution concentration and enthalpy in the refrigeration circuit.

In the cooling mode, the strong solution 83, at a concentration of about 45 percent ammonia refrigerant, is pumped to the first generator 80 where it is heated by the outside source 84 expelling vapor refrigerant ammonia 82 at an enthalpy of about 350 btu/lb. which is conveyed to the entrance of the second generator 81. The heat content is at its highest point as the intermediate solution 85 enters the recuperator 86 exchanging heat with the strong solution 83 passing from the pump 98 to the first generator 80.

Upon entering the second generator 81 heat is added as further vaporous ammonia is expelled at an enthalpy of about 310 btu/lb.

The further heat added results primarily from heat exchanged from the refrigerant 82, but additional heat from exhaust gas or from another source 90 may also be added.

Heat is extracted in the first or second heat exchanger 100 or 115, which ever is operating as the condenser in the system. The concentration then increases from its lowest level of about 39 percent back to its strong solution concentration of 45 percent in the absorber 97 and is conveyed to the inlet of the solution pump 98.

Other investigators have demonstrated air cooled absorption refrigeration systems using other absorbent/refrigerant pairs.

Existing air cooled absorption refrigeration circuits have demonstrated cooling coefficients of performance as high as 0.5 using various absorbent and refrigerant pairs. These systems have also been demonstrated as heating only heat pumps with a coefficient performance of up to 1.3.

This invention uniquely combines a double effect system using ammonia and an absorbent in a system capable of switching by reversing the functions of the condenser and evaporator heat exchangers 100 and 115. Sodium-thiocyanate is the uniquely preferred absorbent.

This system is an air cooled absorption refrigeration system having a demonstrated cooling coefficient as high as 0.85 using the $NH_3$ and NaSCN refrigerant pair with a burner efficiency of 0.85. Using the double effect generator cycle a high efficiency is provided.

DOUBLE EFFECT GENERATOR AND RECUPERATOR APPARATUS

Figure 5:
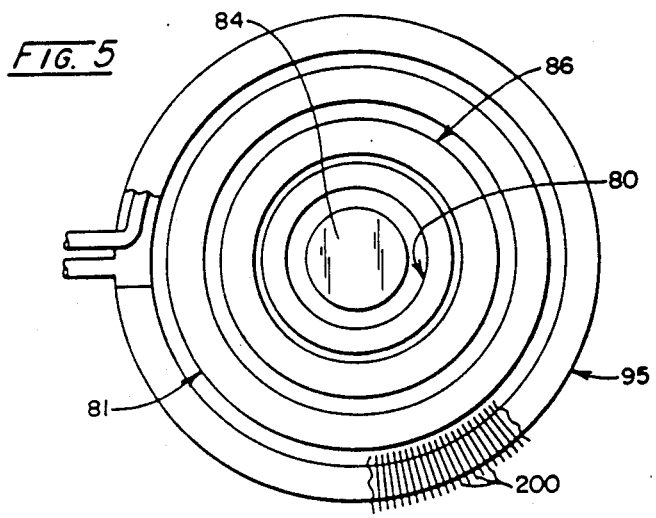
FIG. 5 is a cross-sectional plan view taken on the line 5—5 of FIG. 4.
Figure 4:
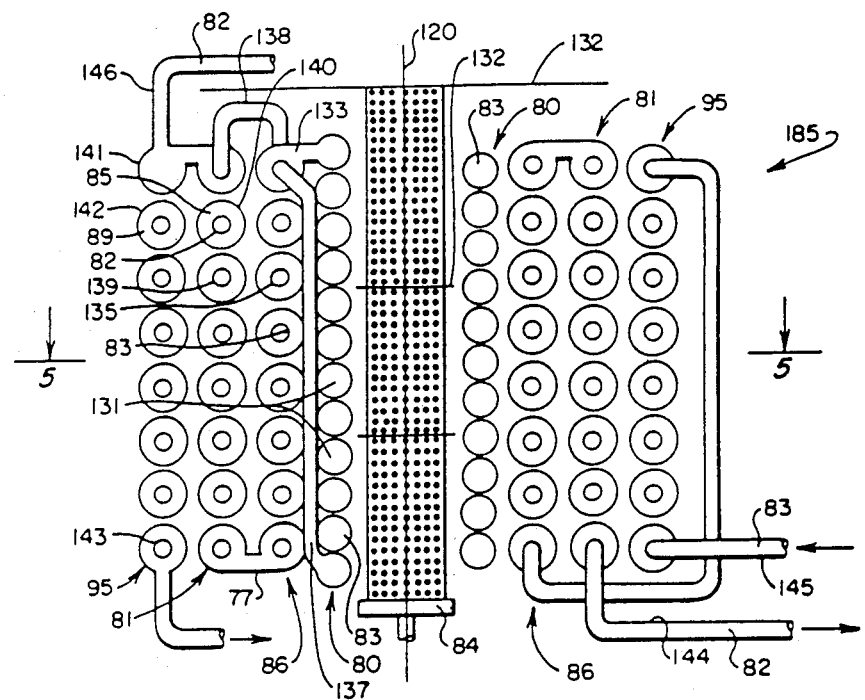
FIG. 4 is a cross-sectional elevation view of the generator/recuperator apparatus of this invention.

Referring to FIGS. 4 and 5 an embodiment of the double effect generator means is shown in apparatus which integrates in one interrelated assembly the various components of the apparatus which are associated with the use of the heat generated in the driving heat source. To facilitate understanding, numeral designations are the same as and refer to like components in the system shown in FIGS. 2 and 3, where appropriate.

A driving heat source 84, typically a gas burner is centrally positioned substantially on a central axis 120 of the annular components including a first effect generator means 80, a recuperator means 86, a second effect generator means 81, and a recuperator means 95. Each component is constructed as a substantially annular coil, or coils and/or plurality of vertically positioned toruses or helical tubings. Each component is juxtaposed to the next, and radially more, or less, distant from the central axis 120.

The recuperators 86, 95, and the second effect generator 81 comprise an inner tube and an outer tube, often referred to as tube-in-tube construction. The materials are conventional, being chosen for good heat transfer through the walls of the tubings. Metals could be suitable.

In the preferred embodiment, the first effect generator 80 comprises a helical coil of tubing into which the strong solution 83 enters from the high temperature recuperator 86 through a connection 137. Heat and combustion products from the source 84 impinge upon the walls 131 of the tubular generator 80. Baffles 132 may be provided to cause the combustion products to flow more or less radially through the generator package and therefore through the gaps between the coils of components 80, 86, 81, and 95. At the top of the generator 80, intermediate solution 85 is transferred to a header/vessel 133 where expelled vaporous refrigerant 82 is conveyed to an inner tube of second generator 81 by connection 138, while intermediate solution 85 is conveyed through the outer tube of the tube-in-tube heat exchange coil structure of the recuperator 86. An inner tube 135 carries the strong solution 83 in counter-current direction to the intermediate solution 85 being conveyed in the outer tubing. However the location of 85 and 83 may be reversed.

At the end of the recuperator 86 the inner tubing 135 is connected to the beginning end of the first generator 80 through a connection 137.

Refrigerant vapor 82 is connected to the inner tube of the second effect generator means through a connection 138. Passing down through the inner tube 139 of the second effect generator 81, the refrigerant 82 passes in counter current heat exchange relationship with the intermediate strength solution 85 passing upward in the outer tube 140. At the lower end of the second effect generator 81, the condensed vapor 82 is conveyed through a connection 144 to the two-way valve 101 where it is switched to the heat exchanger 100 or 115, after isenthalpic expansion in the valve 102 or valve 110.

Heated intermediate strength solution 85 rises in the outer tube of the second effect generator 81 and expells additional refrigerant 82 at a header 141, which also transfers the weak solution 89 to the outer tube 142 of the second recuperator 95. The additional refrigerant 82, is connected through the two-way valve 99 to the heat exhanger 105 or 100 by a connection 146. The weak solution returns to the absorber through throttling valve 96.

Strong solution 83 enters the inner tube 143 of the recuperator 95 through a connection 145 from the pump 98 (shown in FIGS. 2 and 3). The location of weak solution 89 and strong solution 83 may be reversed; i.e., 83 in the outside and in 89 inside.

The generator unit 185 efficiently combines the various components 80, 86, 81, and 95 that are used in the double effect absorption system of this invention. The temperature gradient through these components decreases progressively outward in the operation of the double effect absorption cycle. With the arrangement of components in a series of coils which surround a component of higher temperature in the gradient, and with the burner in the center, the heat and combustion products naturally radiate outward in decreasing magnitude. The burner is centrally positioned on the axis and closest to the first effect generator, which is the point in the cycle of highest temperature, and provides the most effective heat transfer from the source. In addition with the provision of suitable spacing vertically among the coils, the combustion products move radially outward and impinge on other components of the unit thereby increasing the efficiency. For instance, some of the heat from the source 84 will be conducted directly to the second effect generator 81 carrying out the effect of the second direct source of heat 90 shown in FIGS. 2 and 3.

The tube-in-tube concept further renders the unit more compact in carrying out the natural heat gradients which are necessary in the absorption cycle as used in the system of this invention.

Although the preferred embodiment is shown and described, other arrangements may be suitable for different operation conditions—for example, the second effect generator 81 and high temperature recuperator 86 may be interchanged.

Such an interchange, which would position the second effect generator closer to the source of heat 84, will in some circumstances be advantageous since its temperature will be higher, and higher direct heat input may be obtained. On the other hand a tradeoff in efficiency will be incurred since the high temperature recuperator 86 will be operating at a lower heat input from the source and a lower temperature.

In certain circumstances, it may be worthwhile to operate the outermost recuperator means 95 in a condensing mode wherein a portion of the products of combustion from the burner 84 are caused to condense on the outside surface of the outer tube of the recuperator means 95. This is accomplished by increasing the surface area of the outer tube by means of fins 200 shown on a portion of the recuperator 95 in FIG. 5. By the use of fins, the latent heat of condensation of the combustion gas will be imparted to the outer surface of the recuperator 95 raising the temperature of the strong solution passing therethrough. The construction of the recuperator means 95 to operate in the condensing mode is expected to increase the overall efficiency of the process and apparatus of this invention of between about four to eight percent. The particular construction wherein the generators and recuperators are constructed of coils at increasing radial distances from the centrally located source of heat makes the use of this efficiency enhancing condensing mode particularly inexpensive to include in an apparatus and process of this kind.

SOLUTION PUMP/ENERGY RECOVERY MOTORS

In the operation of the absorption refrigeration cycle of the type of this invention a mechanical energy input is necessary in addition to the thermal energy input. Mechanical energy necessary is primarily required to operate the solution pump which circulates the solution pair through the system. In FIGS. 1, 2, and 3 solution pumps 70 and 98 are shown conveying the strong solution from the absorber to the first effect generator through the second and first recuperators. In the operation of the typical system described for FIGS. 6 and 7, the mechanical energy required to raise the solution pressure to about 1200 psia is approximately 670 watts. Providing this mechanical energy using a conventional electric motor and pump requires consumption of approximately 1200 watts of electrical power which would reduce the refrigeration cycle COP by approximately 11 percent.

Figure 8:
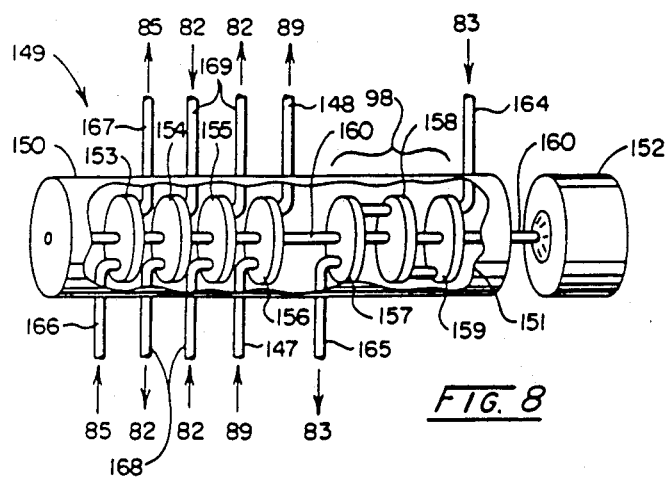
FIG. 8 is a perspective view, partially broken away, of a solution pump and energy recovery motor apparatus of this invention.

In the embodiment of the system of this invention having the maximum COP the energy available at the five isenthalpic throttling valves 87, 96, 102, 120 and 110 is used by constructing the valves in the form of hydraulic or expansion motors connected to augment and be additive to the input to solution pump 98 or other mechanical energy input components such as for the motor 171 and working fluid pump(s). By this means about 1000 watts of mechanical energy, in the typical system under consideration, as shown in FIG. 8, is saved increasing the efficiency in an important degree. In the hydraulic motors the high pressure solution is reduced in pressure by moving pumping elements as motors.

These may be expansion motors, in which the entering pressurized liquid expands to move turbine-like rotary impellers which are connected to the shaft of the electric motor. Other types of hydraulic motors also may be employed, such as gear motors, piston motors, or scroll motors. Thus, as the solution and refrigerant streams are reduced in pressure, the requirement of the electric motor is reduced.

Referring to FIG. 8, the energy recovery motor subsystem is shown as a rotary device including a housing 150 which is broken away on the side 151 so that the inside can be seen. The subsystem 149 includes rotary motor means 152, shown as an electric motor connected by a common shaft to rotary turbine-like expander motors 153-156.

Also connected on the common shaft 160 with the motors is the solution pump 98 comprising three stages 157, 158, and 159.

In additional reference to FIGS. 2, 3, and 4, strong solution 83 enters an inlet 164 to pump 98 and is conveyed from an outlet 165, on the way to the first effect generator 80 through the recuperators 86, 95. Intermediate solution 85 enters the motor 153, through inlet 166, and exits through outlet 167. Refrigerant 82 enters the motors 154 and 155, through inlets 168 and exits through outlets 169. Weak solution 89 enters hydraulic motor 156 through inlet 147 and exits through outlet 148.

Through their interconnection in the common drive means 160, the several hydraulic motors 153-156 and the electric motor 152 combine to provide the mechanial energy necessary to raise the pressure of the strong solution and move the strong solution through the system at the pressure of the first effect generator 80. At the same time, the solution and refrigerant pressures are reduced to those as necessary in the absorption cycle.

When the several hydraulic motors 153-156 and the electric motor 152 are combined to provide the mechanical energy necessary to operate the system, the system has the advantage of being self-governing to a surprisingly greater degree than when the various pumps are operated separately. This measure of controlling the system results from the natural cause and effect when the demands of the system increase and decrease.

When the heat pump is operating with an electric motor driven solution pump in the cooling mode, as the temperature of the ambient heat sink increases, the pressure in the high pressure chamber of the heat pump must also increase, increasing the differential pressure over which the solution pump must operate. As the differential pressure across the pump increases, pump flow decreases, the quantity of refrigerant desorbed from the solution decreases with constant thermal energy input causing the cooling capacity of the heat pump to decrease, with a corresponding decrease in heat pump coefficient of performance. When the heat pump is operating in the heating mode, as the temperature of the ambient source decreases, the pressure in the low pressure chamber of the heat pump must decrease, which also increases the differential pressure over which the solution pump must operate. The heat pump response to increasing differential pressure across the solution pump is the same as in the cooling mode.

When the system is operated with the solution pump and its electric drive motor connected in common with the solution motors and/or the refrigerant motors, as the temperature difference between the heat source or sink and the load increases the pressure in the high pressure chamber of the heat pump increases, and the differential pressure over which the solution motors and refrigerant motors operate also increases. This causes the energy input to the solution pump from the solution and refrigerant motors to increase, largely offsetting the effect of increasing differential pressure on the pumping solution pump and maintaining solution flow relatively constant.

As a result of the insensitivity of the absorbent solution and refrigerant flow rates to external conditions, control of this system is easier and simpler than similar systems without the direct coupled recovery motors.

The common mechanical linkage between the various components in the energy recovery motor system inherently provides this measure of control stability in the system. Without the mechanical linkage each component operates independently according to other external controls which must be provided and operated, such as valve modulation and electrical relays, etc.

Since the solution flow remains essentially constant, the energy required to desorb refrigerant from the solution also remains constant and the refrigerant flow, cooling capacity and COP of the machine remain largely unchanged.

Referring to FIG. 4, when the energy recovery system 149 is employed, hydraulic motor 153, is connected between the outer tube passages of the first recuperator 86 and the second effect generator 81 at an insertion in connection 77.

Hydraulic motor 156 is connected between the outer tube passage of the second recuperator 95 and the inlet to the absorber 97 replacing valve 96 in FIGS. 2 and 3.

Hydraulic motors 153 and 154 in FIG. 8 replace valves 102, 120 and 110 in FIGS. 2 and 3, respectively.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and the appended claims.

We claim:

1. In an absorption refrigeration and/or heating system having components connected in series including at least one generator, a condenser, an evaporator, and an absorber, wherein a refrigerant is absorbed and desorbed or expelled in an absorbent solution, and the application of heat and externally supplied mechanical energy is combined and converted to pressure energy that is applied to or removed from a solution of refrigerant and absorbent, the improvement comprising:
    (a) means to convert the pressure energy and/or phase change energy in the solution and/or refrigerant to mechanical energy, and
    (b) means to replace or supplement the externally supplied mechanical energy in the system with the converted mechanical energy.

2. The improvement according to claim 1 wherein the mechanical energy externally supplied to the system is a rotary motor means driving a pump conveying the refrigerant/absorbent solution from the absorber to the at least one generator, and the means to convert the pressure energy and phase change energy in the refrigerant and the pressure totally in the solution in an expansion and/or hydraulic motor additively connected to the rotary motor.

3. The improvement according to claim 2 wherein the expansion motor includes impellers driven in rotation by the expanding refrigerant vapor.

4. The improvement according to claim 2 wherein the rotary motor is electrically driven from an external source.

5. The improvement according to claim 4 wherein the expansion and/or hydraulic motors are connected with the shaft of the electric motor.

6. The improvment according to claim 5 wherein the electric motor, the refrigerant/absorbent solution pump, and the expansion and/or hydraulic motors are connected in common.

7. The improvement according to claim 6 wherein one of the expansion motors is connected in a conduit conveying refrigerant from the at least one generator to the condensor.

8. The improvement according to claim 6 wherein the at least one of the hydraulic motors is connected in a conduit conveying refrigeration/absorbent solution from the at least one generator to the absorber.

9. An absorption refrigeration and/or heating system in connection with a primary source of heat, a cooling or heating load, and a heat sink or secondary source, to selectively provide heat to or remove heat from the load, comprising:
    (a) a multiple effect generator means to heat an absorbent solution pair comprising a nonvolatile sorbent and a highly volatile refrigerant which is soluble in the absorbent, and to desorb refrigerant from the pair, the generator means comprising a first vessel constructed to receive sufficient heat of combustion to desorb refrigerant from the pair, and at least one additional vessel connected to the first vessel to receive the refrigerant and exchange heat from the refrigerant to the solution pair to further desorb refrigerant from the solution pair;
    (b) a first heat exchanger means connected between the first and second effect generator means and a second heat exchanger means, the first heat exchanger means being constructed to exchange heat between the heat sink or secondary source in proximity thereto and the refrigerant therein; and the second heat exchanger means being constructed to exchange heat between the load and the refrigerant therein, each heat exchanger means selectively connectable to the first and second generator means;
    (c) valve means in the connections between the first and second effect generator means, the first heat exchanger means, and the second heat exchanger means, selectively:
        (i) to cool the load by directing the refrigerant from the first and second effect generator means through the first heat exchanger means to cool the refrigerant by heat exchange with the heat sink, and to direct the refrigerant from the first heat exchanger means to the second heat exchanger means to cool the load by heat exchange between the refrigerant and the load upon expansion of the refrigerant in the second heat exchanger means, or
        (ii) to heat the load by directing the refrigerant from the first and second effect generator means through the second heat exchanger means to heat the load by exchange of heat from the refrigerant fluid to the load, and to direct the refrigerant from the second heat exchanger means to the first heat exchanger means to heat the refrigerant by exchange of heat with the heat sink;
    (d) an absorber means selectively connectable by the valve means to the second heat exchanger means when the second heat exchanger means is cooling the load according to (c) (i) or to the first heat exchanger means when the second heat exchanger means is heating the load according to (c) (ii); and
    (e) a pump means that is connected between the absorber means and the first generator means to transfer the strong solution to the first generator means at higher pressure and that is driven by a rotary motor means and at least one hydraulic and/or expansion motor means connected to a common shaft of the rotary motor means, the hydraulic and/or expansion motor being driven by the throttling of the solution pair conveyed from the generator means and/or the expansion of the refrigerant conveyed from the generator means.

10. A system according to claim 9 wherein the rotary motor means is an externally powdered electric motor and the at least one expansion motor includes impellers driven in rotation by the expanding refrigerant.

11. A system according to claim 10 wherein the electric motor, the pump means, and the expansion and hydraulic motors are connected in common.

* * * * *